United States Patent [19]
Shimizu et al.

[11] Patent Number: 5,721,881
[45] Date of Patent: Feb. 24, 1998

[54] METHOD FOR CONTROLLING AUTOMATIC LOG-ON FUNCTION

[75] Inventors: Hidenori Shimizu; Masaru Yokoyama, both of Yokohama; Yasuaki Hattori, Kanagawa-ken, all of Japan

[73] Assignee: Hitachi, Ltd., Tokyo, Japan

[21] Appl. No.: 680,811

[22] Filed: Jul. 16, 1996

[30] Foreign Application Priority Data

Jul. 19, 1995 [JP] Japan .................... 7-182378

[51] Int. Cl.$^6$ .................................................. G06F 9/00
[52] U.S. Cl. ...................... 395/500; 395/200.12
[58] Field of Search ....................... 395/500, 700, 395/800, 375, 602, 200.06, 200.12; 370/60; 379/395

[56] References Cited

U.S. PATENT DOCUMENTS

| | | | |
|---|---|---|---|
| 4,621,359 | 11/1986 | McMillen | 370/60 |
| 4,748,558 | 5/1988 | Hirosawa et al. | 364/200 |
| 5,287,466 | 2/1994 | Kodama | 395/375 |
| 5,488,657 | 1/1996 | Lynn et al. | 379/395 |
| 5,535,393 | 7/1996 | Reeve et al. | 395/700 |
| 5,640,584 | 6/1997 | Kandasamy et al. | 395/800 |

FOREIGN PATENT DOCUMENTS 95 08807  3/1995  WIPO.

OTHER PUBLICATIONS

"Strategies for Dynamic Load Balancing on Highly Parallel Computers", by Willebeek-LeMair et al., IEEE Transactions on Parallel and Distributed Systems, vol. 4, No. 9, Sep. 1993, pp. 979–993.

"Exploiting Inter Task Dependencies for Dynamic Load Balancing", by Becker et al., IEEE High Performance Distributed Computing, 1994 3rd Int'l. Symposium, Feb. 1994, pp. 157–165.

"Performance Evaluation of Load Distribution Strategies in Parallel Branch and Bound Computations", by Xu et al., IEEE Performance and Distributed Processing, 1995 Symposium (7th), pp. 402–405.

"A Performance Evaluation of Load Balancing Techniques for Join Operations on Multicomputer Database Systems", by Hua et al, IEEE Data Engineering, 1995 11th Int'l Conference, pp. 44–51.

"Dynamic Load Balancing of a Multi–Cluster Simulator on a Network of Workstations", by Schlagenhaft et al., IEEE Parallel and Distributed Simulation, 1995 Workshop, Mar. 1995, pp. 175–180.

"Load Balancing Strategy and Priority of Tasks in Distributed Environments", by Dowaji et al., IEEE Computers and Communications, 1995 Int'l Phoenix Conference, Jul. 1995, pp. 15–22.

IBM Technical Disclosure Bulletin, vol. 37, No. 7, Jul. 1, 1994, p. 243 XP000455500, "Dynamic Load Balancing in a Cluster of Loosely Coupled Systems".

IBM Technical Disclosure Bulletin, vol. 34, No. 9, Feb. 1, 1992, pp. 464–467, XP000301951, "Single System Image and Load Balancing for Network Access to a Loosely Coupled Complex".

*Primary Examiner*—Kevin J. Teska
*Assistant Examiner*—Russell W. Frejd
*Attorney, Agent, or Firm*—Antonelli, Terry, Stout & Kraus, LLP

[57] ABSTRACT

In an environment using the automatic log-on function in a parallel computer system in which one application program runs on a plurality of processors, the concentration of sessions to the application program on a particular processor for which the activation has been completed when the parallel computer system is later activated is prevented and hence the distribution of load is attained. When terminals have been activated or powered on, the session establishment by the automatic log-on function is not executed even if the activation of an application program on one of the processors of the parallel computer system has been completed but the activation status of the application programs on other processors are checked or the execution of the automatic log-on function is suspended for a predetermined time period to control the execution start time of the automatic log-on function.

4 Claims, 5 Drawing Sheets

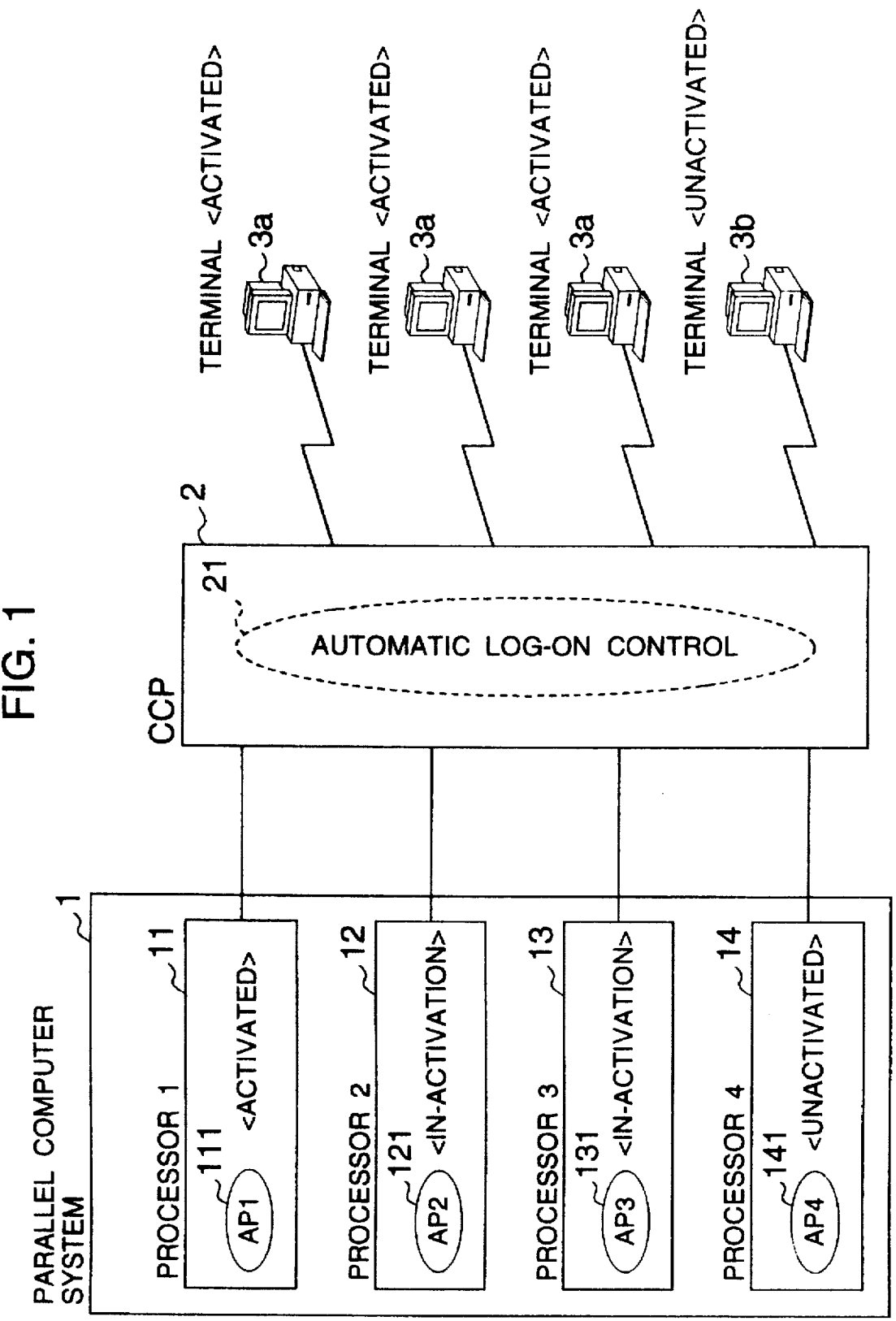

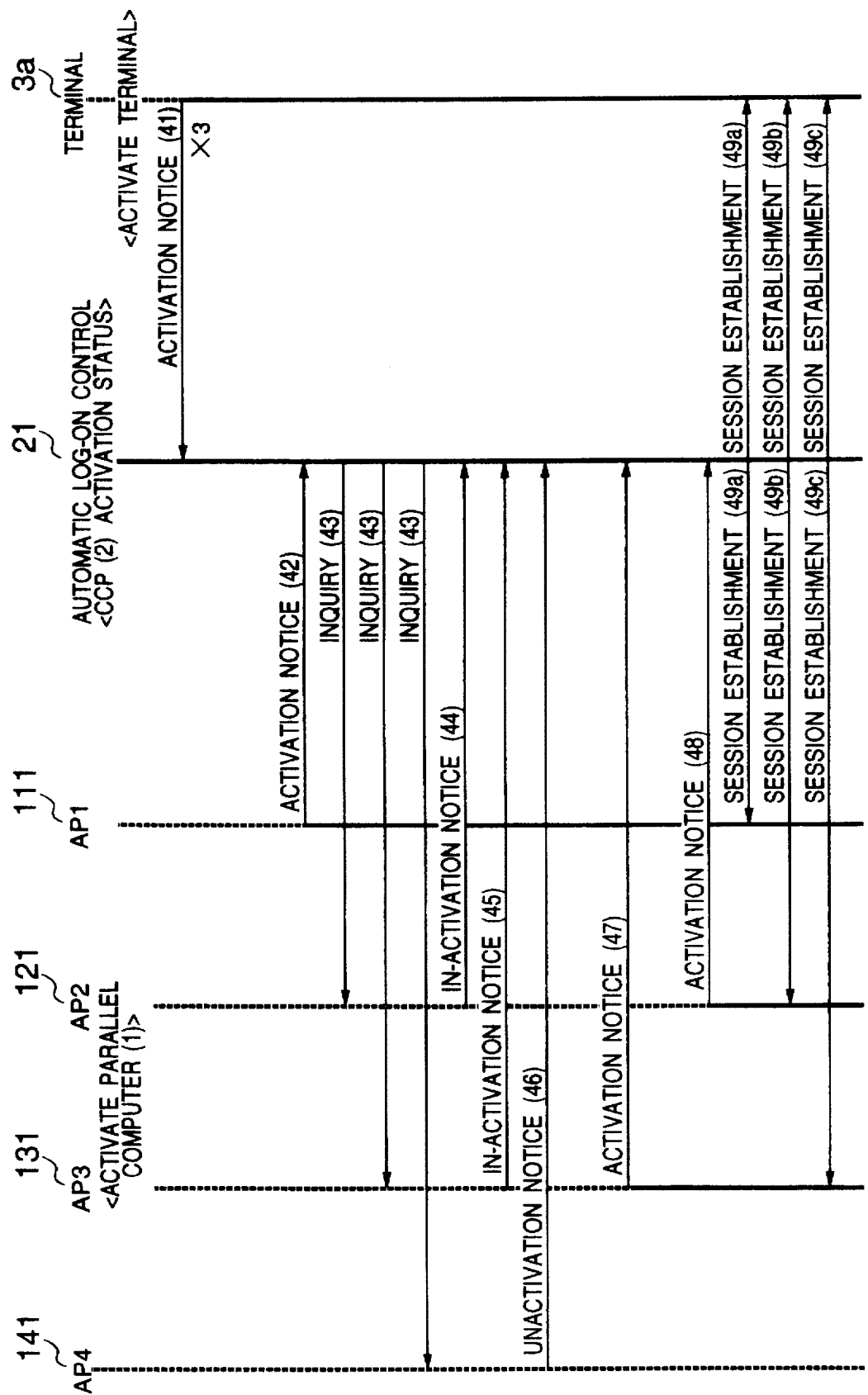

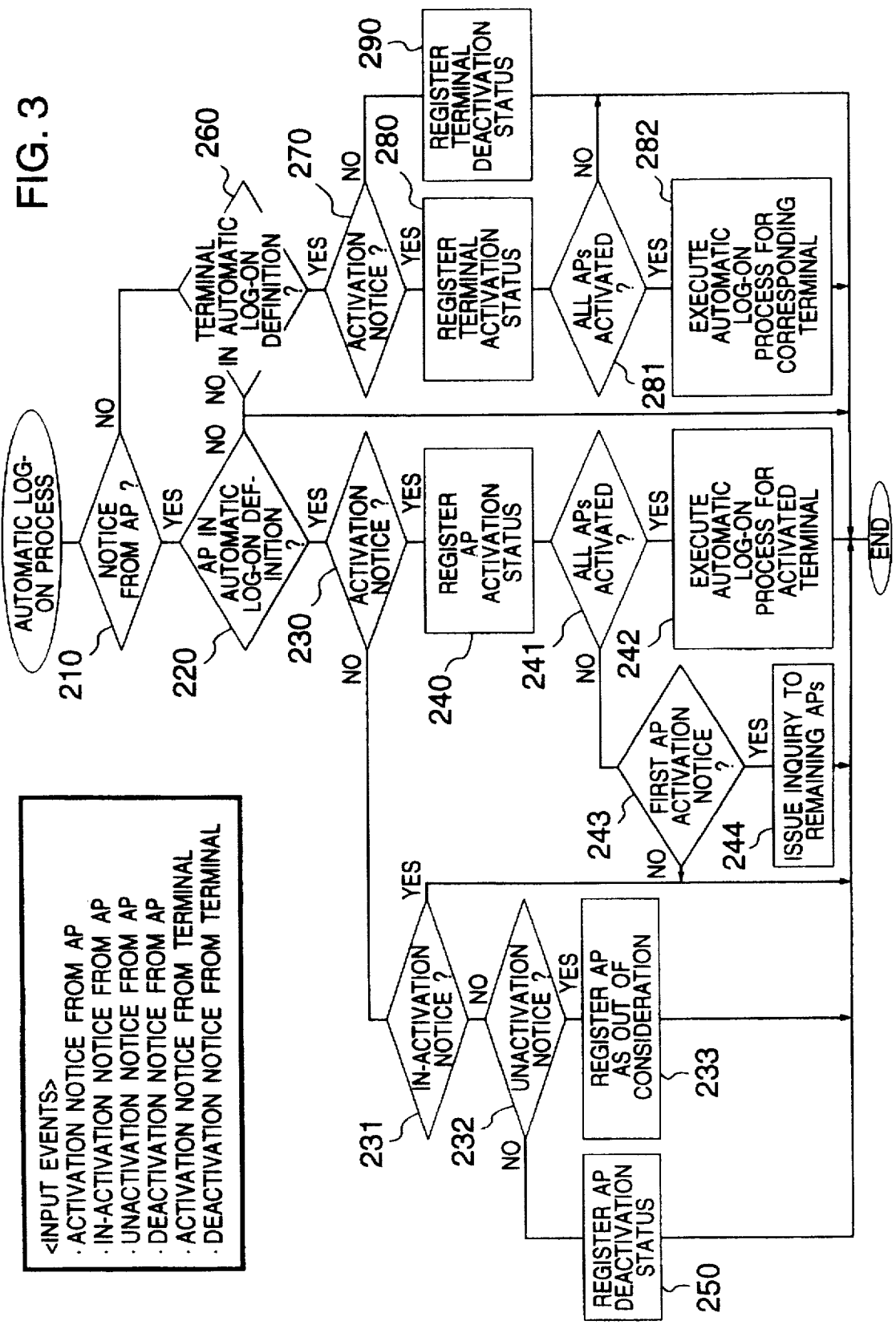

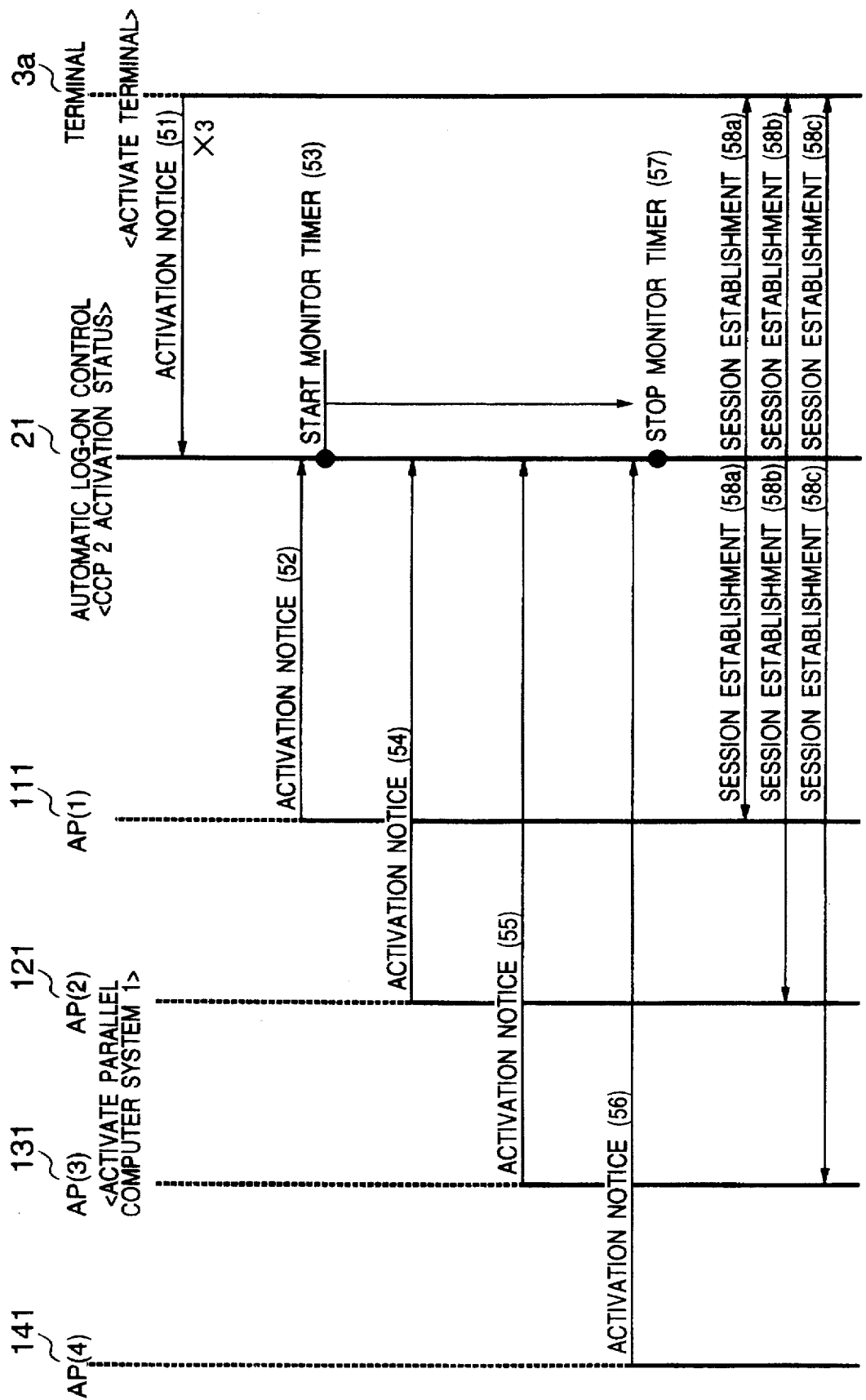

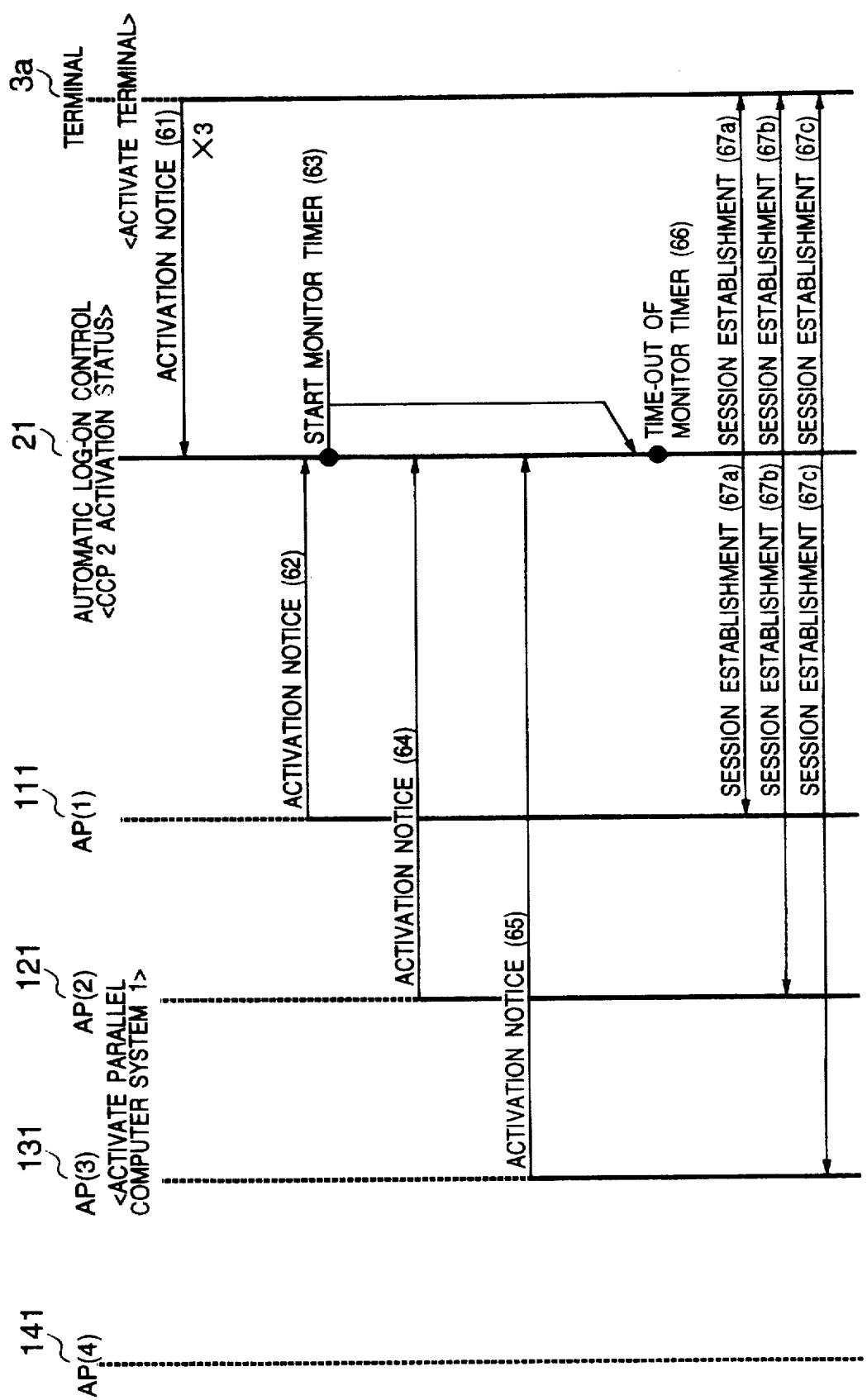

1

METHOD FOR CONTROLLING AUTOMATIC LOG-ON FUNCTION

BACKGROUND OF THE INVENTION

The present invention relates to a method for controlling an automatic log-on function, i.e., a function to automatically establish a session with an application program on a computer upon activation or power-on of a terminal at a destination station, and more particularly to a method for controlling an automatic log-on function which allows the automatic log-on function on a parallel computer system in which an application program runs on a plurality of processors.

In a conventional single computer system or closely coupled computer system, only one partner application program for executing automatic log-on exists.

In a loosely coupled computer, a processor of the closely coupled computer system to which the connection is to be made is specified for each terminal at a destination station.

On the other hand, a recent parallel computer system has a function to permit respective applications programs to run on a plurality of processors while allowing to a terminal to view as if one application program is running, as disclosed, for example, in "ACF/VTAM V4.2" Nikkei Computer, Jun. 13, 1994, page 166 and FIG. 9 on page 165.

The present invention is related to a problem which arises when the automatic log-on function is to be implemented in the parallel commuter system in which one application program runs on a plurality of processors.

When the automatic log-on is implemented by the conventional single computer, it is implemented by informing a log-on request from the terminal to the application program by a log-on character sequence from the terminal or alternative means when the activation states of both of a pre-defined application program to be automatically logged on and a terminal are detected. In this case, since the application program and the terminal is in one-to-one correspondence, the combination of the automatic log-on is constant whether the application program is first activated or the terminal is first activated. However, when the automatic log-on is to be implemented in the parallel computer system in which one application program runs on a plurality of processors, the application program to be actually automatically logged on runs on the plurality of processors even if the pre-defined combination of the application program to be automatically logged on and the terminal has one-to-one correspondence, and the application program running on a particular processor for which the automatic log-on is to be executed should be determined to an optimum processor having a low load condition by judging a load condition of the processors. If the terminal is activated after the application programs on all processors have been activated, it is possible to select an optimum processor having a low load condition by judging the load condition of the processors.

However, when the automatic log-on function is to be implemented in the parallel computer system in which one application program runs on a plurality of processors, if the parallel computer system is activated after some terminals at destination stations have been activated, sessions with the activated terminals are established for the application program which is first activated in the parallel computer system so that the load of the parallel computer system is not distributed but the establishment of the sessions is concentrated to only the application program on the specific processor which has first been activated.

SUMMARY OF THE INVENTION

In the light of above, it is an object of the present invention to solve the problems encountered in the conventional technique and provide a method for controlling an automatic log-on function which prevents the concentration of load in the parallel computer system by controlling an execution start timing of the automatic log-on function.

The object of the present invention is achieved by a method for controlling an automatic log-on function in an environment using the automatic log-on function in a parallel computer system in which one application program runs on a plurality of processors, comprising the step of checking activation status of the application programs among the processors to prevent the concentration of sessions to the application program in the parallel computer system which has first been activated when the application programs of the processors of the parallel computer system are activated after some terminals at destination stations have already been activated.

More specifically, the method comprises the step of not executing the automatic log-on function when a specific application program has first been activated but (1) checking activation status of the application programs on other processors and waiting for the completion of the activation of application programs which are being activated, (2) suspending the execution of the automatic log-on function for a predetermined time period and waiting for the activation of application programs on other processors, or (3) unconditionally suspending the execution of the automatic log-on function for a predetermined time period of application programs on other processors to prevent the concentration of sessions to the application program in the parallel computer system which has first been activated when the application programs of the processors of the parallel computer system are activated after some terminals at destination stations have already been activated.

In the method for controlling the automatic log-on of the present invention, a session is established when both of a condition of the activation of the terminal at the destination station or the activation notice reception by the power-on of the terminal and a condition of the activation of the application program on the computer system are met.

Namely, in the method for controlling the automatic log-on function of the present invention, when the terminal has been activated or activation notice by the power-on has been received, the session is not established by the automatic log-on function even if the application program on one of the processors of the parallel computer system is activated but the activation status of the application programs on other processors are watched or the execution of the automatic log-on function is withheld for a predetermined time period to control the execution start time of the automatic log-on function so that the concentration of the establishment of the session to the application program on the processor which has first been activated when the automatic log-on function is used in the parallel computer system is prevented and the load distribution is attained.

BRIEF DESCRIPTION OF THE DRAWINGS

FIG. 1 shows a configuration of a parallel computer system to which the present invention is applied, FIG. 2 shows an operational sequence in a first embodiment of the present invention, FIG. 3 shows a flow chart of the first embodiment of the present invention, FIG. 4 shows an operational sequence of a second embodiment of the present invention, and FIG. 5 shows an operational sequence of a third embodiment of the present invention.

DESCRIPTION OF THE PREFERRED EMBODIMENTS

The preferred embodiments of the present invention are now explained in detail with reference to the drawings.

[Embodiment 1]

FIG. 1 shows a configuration of a parallel computer system to which a method for preventing the concentration of session by controlling the automatic log-on function in accordance with a first embodiment of the present invention is applied. In FIG. 1, numeral 1 denotes a parallel computer system, numeral 2 denotes a communication control processor (CCP) and numerals 3a and 3b denote terminals. The parallel computer system 1 and the terminals 3a and 3b interconnected by a line or a LAN via the CCP 2. The parallel computer system 1 comprises four processors, a processor (1) 11, a processor (2) 12, a processor (3) 13 and a processor (4) 14.

An application program for establishing a session with the terminal to conduct the communication is located in each processor. It comprises AP (1) 111 which runs on the processor (1) 11 and has first been activated among the application programs in the parallel computer system 1, an AP (2) 121 which runs on the processor (2) 12 and is being activated when the AP (1) 111 has been activated, an AP (3) 131 which runs on the processor (3) 13 and is being activated when the AP (1) 111 has been activated and an AP (4) 141 which runs on the processor (4) 14 and has not been activated when the AP (1) 111 has been activated.

The terminal comprises the activated terminal 3a and the unactivated terminal 3b. In addition, an automatic log-on control 21 is provided in the CCP 2 to monitor the status of the application programs in the respective processors and the status of the terminals to automatically establish the session upon the completion of the activation by both of the notice of activation of the pre-defined or designated application program to be automatically logged on and the notice of activation of the terminal.

An operational sequence of the automatic log-on function in the parallel computer system 1 in the present embodiment is shown in FIG. 2.

FIG. 2 shows the operational sequence after the processors (1), (2), (3) and (4) in the parallel computer system 1 have been activated upon the activation of the parallel computer system 1 and the CCP 2 has been activated. Thereafter, three terminals 3a are activated by the power-on and an activation notice 41 is issued to the automatic log-on control 21.

Thereafter, the application program on each processor in the parallel computer system 1 sequentially executes the process and the AP (1) 111 in the processor (1) 11 is first activated and an activation notice 42 is issued to the automatic log-on control 21.

At this time point, when the automatic log-on control 21 executes the automatic log-on function, all sessions would be established between the three terminals 3a and the AP (1) 111 and the concentration of the load would occur. In order to prevent the concentration of the load, the automatic log-on control 21 issues a status inquiry 43 to the application programs AP (2) 121, AP (3) 131 and AP (4) 141 of the other processors when it receives the activation notice 42 from the AP (1) 111.

In the sequence shown in FIG. 2, an in-activation notice 44 is received from the AP (2) 121, an in-activation notice 45 is received from AP (3) 131 and an unactivation notice 46 is received from the AP (4) 141. The automatic log-on control 21 waits for the completion of the activation of the AP (2) 121 and the AP (3) 131 for which the in-activation notices 44 and 45 have been received. In case when the AP (2) 121 or the AP (3) 131 which is being activated fails to be activated by some reason, a monitor timer is activated and when the monitor timer times out, the waiting of the completion of activation for the application programs for which the activation has not yet been completed by that time is terminated and the automatic log-on function is executed at that time.

In a normal state, as shown in the present sequence, the activation of the AP (3) 131 is completed and the automatic log-on control 21 receives the activation notice 47, the activation of the AP (2) 121 is completed and the automatic log-on control 21 receives the activation notice 48, and when the activation of all application programs to be activated is completed, the automatic log-on control 21 executes the automatic log-on function to allocate the establishment of session with the three activated terminals 3a to conduct the session establishment 49a between the AP (1) 111 and the terminal 3a, the session establishment 49b between the AP (2) 121 and the terminal 3a and the session establishment 49c between the AP (3) 131 and the terminal 3a to prevent the concentration of the load and attain the distribution of the load.

FIG. 3 shows a flow chart of the automatic log-on control 21 to implement the above embodiment. Input events to the present flow chart are the activation notice and deactivation notice from the application program running on each processor in the parallel computer system 1 and the activation notice and deactivation notice from the terminals 3a and 3b connected by the line or LAN via the CCP 2.

An operation when the activation notice or deactivation notice is received from the application program is first explained. When an event is entered in the flow chart, whether it is a notice from the application program or a notice from the terminal is first determined (step 210). If it is the notice from the application program, whether the application program which issued the notice is the subject of the automatic log-on process or not and whether it is registered in the combination definition of the application program and the terminal for the automatic log-on or not are determined (step 220). If it is registered in the automatic log-on definition, the process is continued but if it is not registered, the process exits and is terminated. When it is in the definition, whether the notice from the application program is the activation notice or the deactivation notice is determined (step 230). If it is the activation notice, the status of the corresponding application program is registered as the activation status (step 240). Then, whether the activation notices have been issued from all application programs under consideration and the activations thereof have been completed or not are determined (step 241). If all application programs have been activated, the automatic log-on process for the terminal which has been activated and registered as the terminal activation status is executed for the present application program (step 242). If not all application programs have been activated, whether it is the activation notice from the first application program or not is determined (step 243). If it is the activation notice from the first application program, it is necessary to check the status of the remaining application programs. An inquiry of status is issued to each application program (step 244). On the other hand, if it is not the activation notice from the first application program, the process exits and is terminated.

If the notice from the application program is not the activation notice, whether the notice is the in-activation notice or not is determined (step 232). If it is the in-activation notice, the process exits and waits until the activation notice is issued. If it is not the in-activation notice, whether the notice is the unactivation notice or not (step 232). If it is the unactivation notice, there is no possibility of receiving the activation notice and the corresponding application is put out of the consideration (step 233) and the process exits. If the notice is not the unactivation notice, it is the deactivation notice and the corresponding application program is registered as the deactivation status (step 250) and the process exits.

If it is the notice from the terminal, whether the terminal which issued the notice is the subject of the automatic log-on process or not and whether it is registered in the combination definition of the application program and the terminal for the automatic log-on or not are determined (step 260). If it is in the automatic log-on definition, the process is continued but if it is not in the definition, the process exits and is terminated. If it is in the definition, whether the notice from the terminal is the activation notice or the deactivation notice is determined (step 270). If it is the activation notice, the corresponding terminal status is registered as the activation status (step 280). Then, whether the activation notices have been issued from the application programs on all processors for which the present terminal is to execute the automatic log-on and whether the activations have been completed or not are determined (step 281). If all application programs have been activated, the automatic log-on process is executed for the application program for which the automatic log-on of the present terminal is defined (step 282). If not all application programs have been activated, the process exits and waits for the activation notices from all application programs other than the application program under consideration.

In the flow chart, a monitor timer for monitoring the failure of activation of the application program is omitted.

In accordance with the present embodiment, the concentration of the sessions in which the activated terminal establishes the sessions in only the application program which first issued the activation notice is prevented and the distribution of the load is attained. In the present embodiment, a loss due to wasteful waiting time to wait for the processor or the application program which may possibly complete the activation is reduced compared with Embodiment 2 and Embodiment 3 to be described later.

[Embodiment 2]

A method for preventing the concentration of the sessions by controlling the automatic log-on function in accordance with a second embodiment of the present invention is now explained.

The method of present embodiment controls the execution start time of the automatic log-on function shown in the Embodiment 1 by another means in the same configuration as that (see FIG. 1) of the Embodiment 1. An operational sequence of the present embodiment is shown in FIG. 4.

FIG. 4 shows an operational sequence after the processors (1), (2), (3) and (4) in the parallel computer system 1 have been activated upon the activation of the parallel computer system 1 and the CCP 2 has been activated as FIG. 2 does. Thereafter, the three terminals 3a are activated and an activation notice 51 is issued to the automatic log-on control 21.

Then, the application program on each processor of the parallel computer system 1 sequentially executes the activation process. First, the AP (1) 111 in the processor (1) 11 completes the activation and issues an activation notice 52 to the automatic log-on control 21. The automatic log-on control 21 executes the monitor timer activation 53 to wait for the activation of the application programs in other processors for a predetermined time period.

Before the monitor timer times out, the automatic log-on control 21 receives the activation notice 54 by the completion of the activation of the AP (2) 121, receives the activation notice 55 by the completion of the activation of the AP (3) 131 and receives the activation notice 56 by the completion of the activation of the AP (4) 141.

In this manner, when the automatic log-on control 21 detects that the activation of all of the application programs AP (1), AP (2), AP (3) and AP (4) has been completed, it stops the monitor timer (step 57) and executes the automatic log-on function to the application programs AP (1) 111, AP (2) 121, AP (3) 131 and AP (4) 141 for which the activation notices have been received so far to allocate the session establishment for the three activated terminals 3a to conduct the session establishment 58a between the AP (1) 111 and the terminal 3a, the session establishment 58b between the AP (2) 121 and the terminal 3a and the session establishment 58c between the AP (3) 131 and the terminal 3a to prevent the concentration of the load and attain the distribution of the load.

In accordance with the present embodiment, the concentration of sessions in which the activated terminal establishes the sessions in only the application program that first issued the activation notice is prevented and the distribution of the load is attained. In the present embodiment, complex control to check the status of other processors or application programs is not needed and when all application programs have been activated, the automatic log-on function may be executed at that time point so that a loss by a wasteful waiting time to always wait for a predetermined time period is reduced compared with a method for unconditionally monitoring by a timer as it is in a third embodiment to be described later.

[Embodiment 3]

A method for preventing the concentration of sessions by controlling the automatic log-on function in accordance with a third embodiment of the present invention is now explained.

The method of the present embodiment controls the execution start time of the automatic log-on function shown in the Embodiment 1 by another means in the identical configuration to that (see FIG. 1) shown in the Embodiment 1. An operational sequence of the present embodiment is shown in FIG. 5.

FIG. 5 shows the operational sequence after the processors (1), (2), (3) and (4) of the parallel computer system 1 have been activated upon the activation of the parallel computer system 1 and the CCP 2 has been activated as FIG. 2 does. Thereafter, the activation of the three terminals 3a is completed and an activation notice 61 is issued to the automatic log-on control 21.

Then, the activation process of each processor of the parallel computer system 1 is sequentially conducted. First, the AP (1) 111 in the processor (1) 11 completes the activation and issues an activation notice 62 to the automatic log-on control 21.

At this time, the automatic log-on control 21 conducts monitor timer activation 63 to unconditionally wait for the activations of the application programs in other processors for a predetermined time period. Before the monitor timer is timed out, the automatic log-on program 21 receives an activation notice 64 by the completion of the activation of the AP (2) 121 and receives an activation notice 65 by the completion of the activation of the AP (3) 131.

Thereafter, when the time-out 66 of the monitor timer occurs, the automatic log-on control 21 executes the automatic log-on function to the application programs AP (1) 111, AP (2) 121 and AP (3) 131 for which the activation notices have been received so far to allocate the session establishment for the three activated terminals to conduct the session establishment 67a between the AP (1) 111 and the terminal 3a, the session establishment 67b between the AP (2) 121 and the terminal 3a and the session establishment 67c between the AP (3) 131 and the terminal 3a to prevent the concentration of the session and attain the distribution of the load.

In accordance with the present embodiment, the concentration of the sessions in which the activated terminal establishes sessions in only the application program that first issued the activation notice is prevented and the distribution of the load is attained. In the present embodiment, complex control to detect the status of other processors or application programs and complex program to determine whether all application programs have been activated or not are not required.

The above embodiments illustrate examples of the present invention and it should be noted that the present invention is not limited to those embodiments.

As described hereinabove, in accordance with the present invention, the method for controlling the automatic log-on function which permits the prevention of the concentration of the load in the parallel computer system by controlling the execution start time of the automatic log-on function is attained.

More specifically, in an environment using the automatic log-on function in the parallel computer system in which one application program runs on a plurality of processors, when the parallel computer system is activated after some terminals at destination stations have already been activated, the concentration of sessions to the application program on the processor in the parallel computer system which has first been activated because the sessions with all activated terminals are established for that processor is prevented and the distribution of the load is attained so that the scalability which is one of the intended functions of the parallel computer system is secured.

What is claimed is:

1. A method for controlling an automatic log-on function in an environment using the automatic log-on function in a parallel computer system in which one application program runs on a plurality of processors, comprising the step of:

checking activation status of the application programs among the processors to prevent concentration of sessions to an application program in the parallel computer system which has first been activated when the application programs of the processors of the parallel computer system are activated after some terminals at destination stations have already been activated.

2. A method for controlling an automatic log-on function in an environment using the automatic log-on function in a parallel computer system in which one application program runs on a plurality of processors, comprising the step of:

not executing the automatic log-on function when a specific application program has first been activated but checking activation status of the application programs on other processors and waiting for completion of activation of application programs which are being activated to prevent concentration of sessions to the application program in the parallel computer system which has first been activated when the application programs of the processors of the parallel computer system are activated after some terminals at destination stations have already been activated.

3. A method for controlling an automatic log-on function in an environment using the automatic log-on function in a parallel computer system in which one application program runs on a plurality of processors, comprising the step of:

not executing the automatic log-on function when a specific application program has first been activated but suspending execution of the automatic log-on function for a predetermined time period and waiting for activation of application programs on other processors to prevent concentration of sessions to the application program in the parallel computer system which has first been activated when the application programs of the processors of the parallel computer system are activated after some terminals at destination stations have already been activated.

4. A method for controlling an automatic log-on function in an environment using the automatic log-on function in a parallel computer system in which one application program runs on a plurality of processors, comprising the step of:

not executing the automatic log-on function when a specific application program has first been activated but unconditionally suspending execution of the automatic log-on function for a predetermined time period to prevent concentration of sessions to the application program in the parallel computer system which has first been activated when the application programs of the processors of the parallel computer system are activated after some terminals at destination stations have already been activated.

* * * * *